US012579847B2

(12) United States Patent
Lei

(10) Patent No.: US 12,579,847 B2
(45) Date of Patent: Mar. 17, 2026

(54) METHOD AND APPARATUS FOR ONE TO MANY VEHICLE BROADCAST HANDLING

(71) Applicant: FORD GLOBAL TECHNOLOGIES, LLC, Dearborn, MI (US)

(72) Inventor: Oliver Lei, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 1642 days.

(21) Appl. No.: 16/744,874

(22) Filed: Jan. 16, 2020

(65) Prior Publication Data

US 2021/0225092 A1    Jul. 22, 2021

(51) Int. Cl.
*G07C 5/00* (2006.01)
*G01C 21/34* (2006.01)
*G07C 5/08* (2006.01)

(52) U.S. Cl.
CPC ......... *G07C 5/008* (2013.01); *G01C 21/3461* (2013.01); *G07C 5/0808* (2013.01)

(58) Field of Classification Search
CPC ... G07C 5/008; G07C 5/0808; G01C 21/3461
See application file for complete search history.

(56) References Cited

U.S. PATENT DOCUMENTS

| | | | | | |
|---|---|---|---|---|---|
| 9,832,241 | B1 * | 11/2017 | Hayward | ......... | G08G 1/096883 |
| 10,439,683 | B1 * | 10/2019 | Baumgartner | ........ | H04L 1/0058 |
| 2003/0009765 | A1 * | 1/2003 | Linden | ................. | H04N 21/233 |
| | | | | | 725/95 |

| | | | | | |
|---|---|---|---|---|---|
| 2008/0032721 | A1 * | 2/2008 | MacDonald | .......... | H04L 51/214 |
| | | | | | 455/466 |
| 2008/0046172 | A1 * | 2/2008 | Ames | ..................... | G01C 21/28 |
| | | | | | 701/532 |
| 2013/0289859 | A1 * | 10/2013 | Kim | ..................... | G08G 1/0116 |
| | | | | | 701/117 |
| 2015/0112579 | A1 * | 4/2015 | Finnis | .................. | G08G 1/0969 |
| | | | | | 701/117 |
| 2017/0084175 | A1 * | 3/2017 | Sedlik | .............. | G08G 1/096725 |
| 2017/0302982 | A1 * | 10/2017 | Simpson | ............ | H04N 21/2407 |

FOREIGN PATENT DOCUMENTS

EP            3002895 A1        5/2009

OTHER PUBLICATIONS

ATSC 3.0 Broadcasts to Deliver Data to Connected and Autonomous Vehicles—ATSC; Jul. 12, 2019.

* cited by examiner

*Primary Examiner* — Calvin Cheung
(74) *Attorney, Agent, or Firm* — Joseph Zane; Brooks Kushman P.C.

(57) ABSTRACT

A system wirelessly receives identification of a reportable navigation event from one or more vehicles, the identification including vehicle location information. The system determines a locality to which the reportable event applies. The system determines one or more television broadcast stations predefined as having a broadcast area that covers the locality. Additionally, the system defines navigation data for vehicle navigation systems to address the event and deliver the navigation data to the determined television stations, along with broadcast instructions for the television stations to broadcast the navigation data via Advanced Television System Committee (ATSC) technology.

6 Claims, 3 Drawing Sheets

METHOD AND APPARATUS FOR ONE TO MANY VEHICLE BROADCAST HANDLING

TECHNICAL FIELD

The illustrative embodiments generally relate to methods and apparatuses for one-to-many vehicle broadcast handling.

BACKGROUND

Connected vehicles have the capability to both send and receive data. In many instances, this is achieved via a direct one-to-one connection, where a vehicle establishes a connection with a remote server and receives or sends useful data (map update, software update, etc). In instances where the connection is facilitated using cellular services, for example, this can incur a high data cost in the aggregate when a distributor of the data (e.g., an Original Equipment Manufacturer (OEM)), has to send the data to a large number of vehicles.

Advanced Television System Committee (ATSC) 3.0 technology allows for using a TV frequency to broadcast data and then various vehicles or other entities can receive the data as part of a broadcast. This provides a one-to-many opportunity, but typically does not involve intended direct communication with a single entity. That is, the information is part of a broadcast, and then the receiving entities must receive and process the data included in the broadcast, when the data may not have been intended for a given receiving entity or may be non-applicable to that entity.

SUMMARY

In a first illustrative embodiment, a system includes a processor configured to wirelessly receive identification of a reportable navigation event from one or more vehicles, the identification including vehicle location information. The processor is also configured to determine a locality to which the reportable event applies. The processor is further configured to determine one or more television broadcast stations predefined as having a broadcast area that covers the locality. Additionally, the processor is configured to define navigation data for vehicle navigation systems to address the event and deliver the navigation data to the determined television stations, along with broadcast instructions for the television stations to broadcast the navigation data via Advanced Television System Committee (ATSC) technology.

In a second illustrative embodiment, a system includes a processor configured to wirelessly receive identification of a reportable software error event from one or more vehicles, the identification including software version identification. The processor is further configured to determine other vehicles having the identified software version. Also, the processor is configured to obtain a patch for the identified software version and define receipt instructions designating one or more vehicle characteristics of a receiving vehicle that should process the patch. Additionally, the processor is configured to deliver the patch and receipt instructions to one or more television stations, along with broadcast instructions for the television stations to broadcast the patch and receipt instructions data via Advanced Television System Committee (ATSC) technology.

In a third illustrative embodiment, a vehicle includes an Advanced Television System Committee (ATSC) receiver and a processor. The processor is configured to receive vehicle messages broadcast via ATSC technology through the ATSC receiver. The processor is further configured to examine receipt characteristics included with the messages to determine if a given message should be processed onboard the vehicle based on a vehicle characteristic compared to a characteristic identified in the given message. The processor is additionally configured to extract vehicle data from messages when the vehicle includes a characteristic matching a characteristics identified in the given message as a receipt parameter and execute instructions included with the vehicle data to apply the vehicle data to a system to which the vehicle data pertains as identified in the given message.

DETAILED DESCRIPTION

Figure 1:
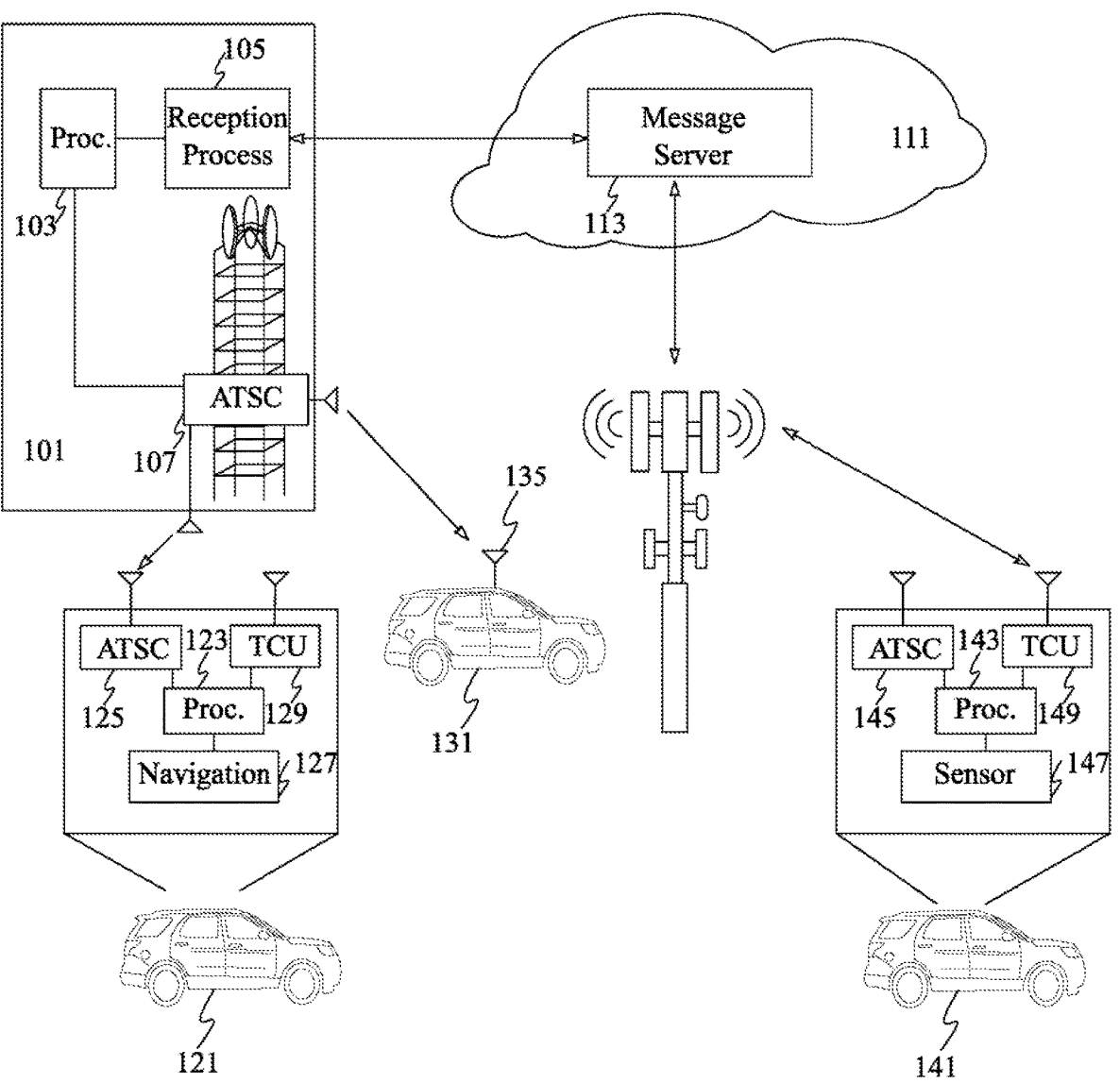
FIG. 1 shows an illustrative ATSC system in communication with a cloud server and multiple vehicles.

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Using a server in conjunction with ATSC television stations, a broadcasting entity (e.g., OEM) can prepare and send targeted data designed to reach multiple vehicles within a station's broadcast range, in a one-to-many fashion. That is, instead of delivering the data to each vehicle individually via a direct connection with a given vehicle, the entity can prepare data that is useful for a designated group of vehicles and send the data and instructions to broadcast to an ATSC station. The station can then send the ATSC broadcast and a large number of vehicles can receive the data at the same time.

Since the data may only be applicable or relevant to a subset of receiving vehicles, the server can also prepare information indicative of the vehicles to which the data applies. For example, if the data relates to a road anomaly, the server can designate a coordinate range around the anomaly, or a time of day when the anomaly is applicable, etc. If the data relates to a software update, the server can designate a software version, or even specific vehicle identification number (VIN) or electronic serial number (ESN) elements.

When a vehicle receives the broadcast, it can check parameter data associated with the broadcast to determine the applicability of the data contained in the broadcast. If the parameter data indicates that the vehicle can use the broadcast data, then the vehicle can process the broadcast or send it to the proper internal system (update process, nav system, etc) for handling.

Through the illustrative embodiments and the like, significant cost savings for communicating data to a large group of vehicles can be achieved, as well as speeding up delivery via the broadcast to all vehicles at once. The broadcast can persist as well, so that vehicles that enter a broadcast area while the broadcast is ongoing may still receive and benefit from the broadcast.

FIG. 1 shows an illustrative ATSC television system 101 in communication with a cloud 111 server 113 and multiple vehicles 121, 131, 141. In this example, the ATSC system 101 is an ATSC television station, capable of sending ATSC broadcasts to a known broadcast area. The station includes some form of process 105 for receiving updates, which is commonly connected to a wide area network (e.g., the Internet), but which also may utilize a cellular or other connection. Through the process 105, the station 101 receives instructions from the cloud 111 server 113 and processes those instructions to devise a broadcast, at station computer equipped with a processor 103. Once the broadcast is ready, the processor 103 can instruct the ATSC transmitter 107 to send out the broadcast to any vehicles 121, 131 within a reception area.

In the example shown, any one of the vehicles 121, 131, 141 may report an anomaly to the cloud 111 server 113 via cellular connection or other connection. In some instances, such as vehicle 141, the vehicle may include a sensor suite 147. These suites may be more common in autonomous vehicles 141, which may include a variety of detection systems that are not provided to other vehicles 121, 131.

In other instances, the vehicle may be a human-driven vehicle 121, 131, and may include a processor 123, an ATSC transceiver 125, a navigation process 127 and other onboard processes, and a telematics control unit (TCU) 129. If and when the vehicle 121 detects an anomaly, such as an onboard software error, the vehicle 121 may report the anomaly to the server 113 using the TCU 129 and a cellular connection, or other direct connection (e.g., Wi-Fi). FIG. 1 shows vehicle 141 communicating cellular data through TCU 149, through a cellular tower, to the cloud server 113. This vehicle 141 could be reporting anomalies detected through sensors 147, traffic, software errors, etc. Any vehicle can potentially communicate an anomaly to the cloud 111.

Vehicle 131 has similar components to vehicle 121 but is shown as a simple vehicle 131 for the sake of demonstrating that the broadcast from the station 101 ATSC transmitter 107 is one-to-many. The antenna shown in the example is an ATSC receiver 135.

Vehicle 141 is an autonomous vehicle or other vehicle with enhanced sensors 147 and may also detect a variety of road-based anomalies (e.g., potholes). Other vehicles 121, 131, may also detect traffic and road anomalies (e.g., traffic, construction), but may not be as well equipped to detect things like potholes. When the vehicle 141 detects a road condition that should be shared with other vehicles 121, 131 (based on a predefined set of what detected conditions should be shared, for example), the vehicle 141, which also has a TCU 149 and a central processor 143, can use the TCU 149 to report the condition to the server 113 via a cellular connection. This vehicle 141 also has an ATSC receiver 145 for receiving ATSC broadcasts from the ATSC transmitter 107 or the like.

The server 113 receives any reported anomalies and determines which vehicles may be impacted by the anomalies and/or how to fix the anomalies if the anomaly is something that can be fixed (e.g., a software update). The server 113 then packages delivery instructions, along with any parameters usable by vehicles 121, 131, 141 to determine if a received broadcast is applicable, and then the server 113 delivers the data package to the station 101. The station 101 can then send the data package to the various vehicles 121, 131, 141, which can individually determine the applicability of the data.

Since the data may include an update to software, even a reporting vehicle 121, for example, may benefit from the data. In other instances, the receiving vehicle 141 may receive the data and confirm, based on the fact that the data/solution was received, that a road or traffic anomaly was successfully reported.

Figures 2, 3, 4:
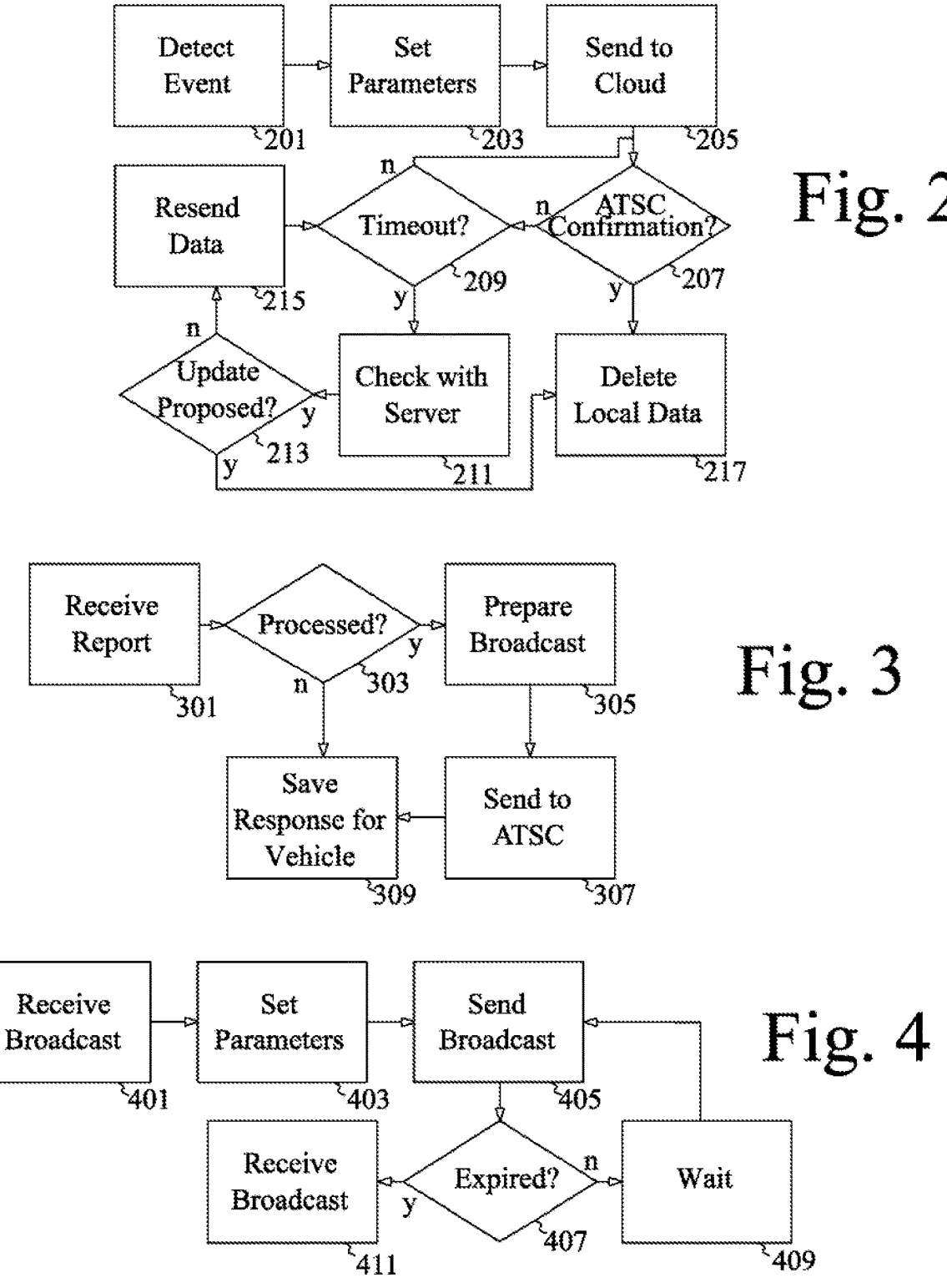
FIG. 2 shows an illustrative process for detecting and reporting an anomaly.
FIG. 3 shows an illustrative process for reported-anomaly handling.
FIG. 4 shows an illustrative process for sending an ATSC broadcast.

FIG. 2 shows an illustrative process for detecting and reporting an anomaly. In this example, the process executing on a vehicle 141 processor 143 detects a reportable event at 201. This can include, for example, a road anomaly, a traffic anomaly, a change to a road (new road, road closure, etc), a software failure or other predefined reportable event.

If there are any parameters associated with the anomaly, the vehicle 141 may set the parameters at 203. For example, the road anomaly may have geographic coordinates associated therewith, as well as a heading or time of day. A software anomaly may have parameters like a software type or version associated therewith, as well as parameters corresponding to particular vehicle systems that utilize or include the software. The vehicle 141 then sends the anomaly and parameters to the server 113 at 205. The server 113 may also report to the OEM, which may then prepare a software fix to address the reported issue. If the software fix was not already pending, the OEM may take some time to solve and release the solution to the reported issue.

Because the sending of the parameters may cause an ATSC update to be sent, in this example, the vehicle 141 determines if an ATSC update has been received via ATSC receiver 145 at 207. This could be a report of the road anomaly or a software update to fix an identified problem. Since the update or report could take a while to process, the vehicle 141 can wait at 209 and continue to check for the ATSC update. Or, the vehicle 141 may simply receive the ATSC update once it is available, without repeat checking.

If the prescribed time-period passes, it is possible that an error has occurred preventing the ATSC update or the software fix is not available yet. Accordingly, in this example, the vehicle 141 communicates directly with the update server 113 at 211. If the server 113 notifies the vehicle 141 that the update has been processed at 213, the vehicle 141 can delete the local data for reporting the anomaly at 217. The same deletion can occur when the vehicle 141 receives the ATSC update that it expects based on the sent data. In other examples, when the vehicle reports an anomaly, it may simply delete the data and the server will address the anomaly in due time. In such an example, the vehicle will not need to receive an update from the server directly and/or check back with the server.

If there was an issue with the update, or the server 113 requires the data again, the vehicle 141 can resend the data at 215 and repeat the process. Since the server 113 may take time to handle the update and may take further time to send the update via the station 101, the vehicle 141, in this example, disconnects without necessarily receiving initial confirmation of update handling, since the vehicle 141 may still receive the ATSC broadcast as confirmation once the update has been processed.

FIG. 3 shows an illustrative process for reported-anomaly handling, executed by, for example, the server 113. In this example, the server 113 receives the report of the anomaly at 301. Because more than one vehicle 121, 131, 141 may report the same anomaly, especially with regards to road and traffic anomalies, the server 113 determines at 303 if the anomaly was already processed (i.e., previously received). If the anomaly was already processed, the server 113 saves a report for the reporting vehicle at 309, in case the vehicle 141 communicates with the server to determine if the report was processed.

If the report was not already processed, the server 113 will process the report and set parameters at 305 that correspond to which vehicles to which the update/broadcast applies. This can also include obtaining a software update for distribution, identifying vehicle parameters for a software update, defining a geo-fence around a road anomaly, etc. The server 113 may further include a duration for the broadcast and/or applicable times-of-day and day-of-week for the broadcast, and then the server 113 sends the instructions and data to the ATSC station 101 at 307.

FIG. 4 shows an illustrative process for sending an ATSC broadcast, executable by, for example, the station 101. In this example, the station 101 receives the broadcast data and any applicable parameters from the server 113 at 401. Since the data may need to be converted for broadcast, such as including a broadcast header file, the station 101 may set any receipt parameters that are to be included in the header file at 403. This can include, for example, geographic parameters, heading parameters or vehicle VIN or ESN parameters.

The station then sends the data as part of an ATSC broadcast at 405. If the broadcast has a defined time period, that has not expired at 407, the station 101 may wait a predefined period of time at 409 and then resend the broadcast. Because the station 101 may be asked to broadcast a large number of data sets, the station 101 may require a wait period between broadcasts, which may also be defined in relation to a type of broadcast—e.g., an emergency broadcast will be ongoing until the emergency abates, but a pothole notification may only be broadcast every X minutes unless no other broadcasts are pending. Once the predefined time period expires, or once the anomaly abates, the station 101 may remove the broadcast from a queue of broadcasts at 411.

Figures 5A, 5B, 6:
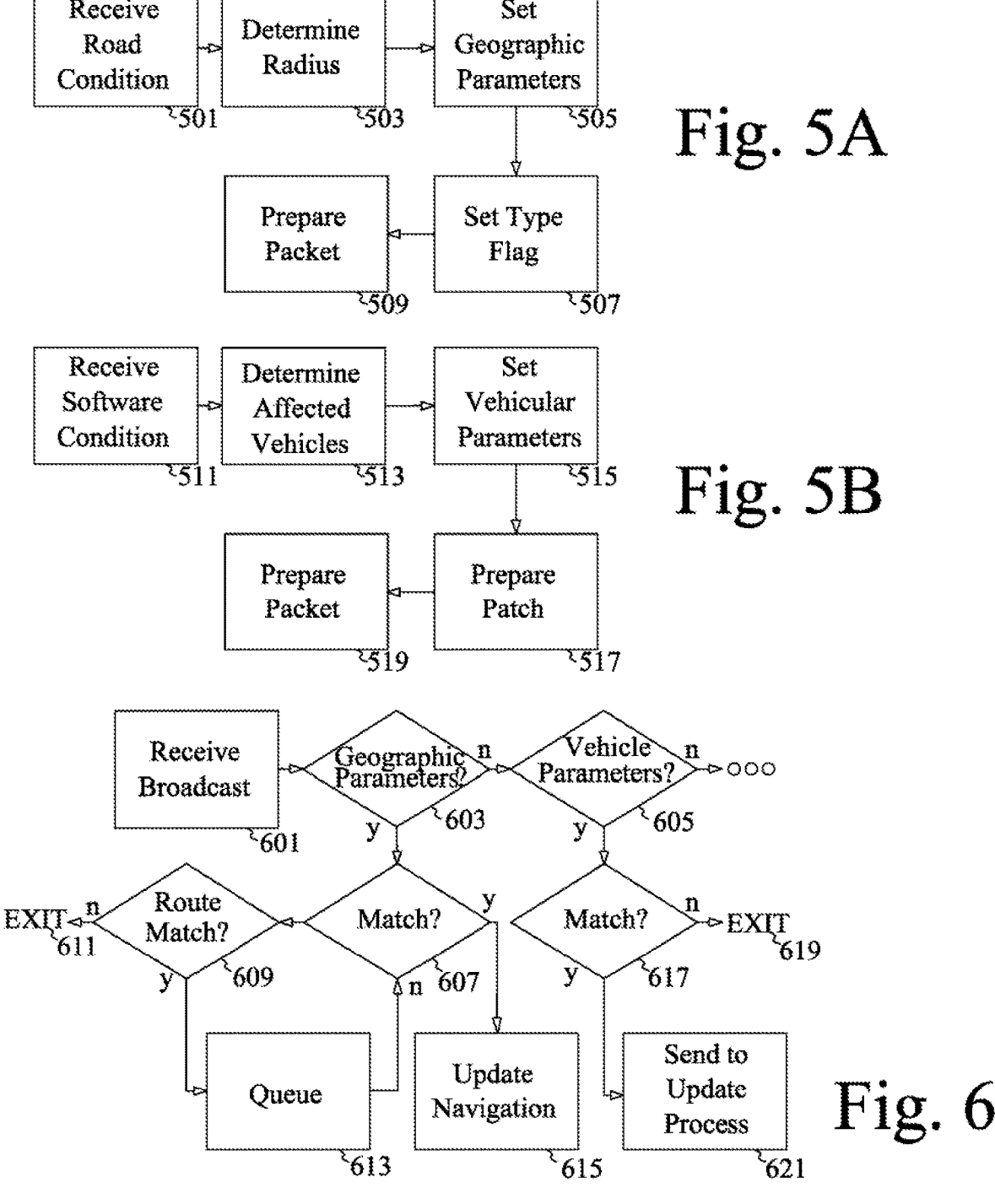
FIGS. 5A and 5B show illustrative processes for preparing broadcasts on various illustrative anomalies.
FIG. 6 shows an illustrative example of a process for received-broadcast handling.

FIGS. 5A and 5B show illustrative processes for preparing broadcasts on various illustrative anomalies, executable by, for example, the server 113. When the server 113 receives a given anomaly, the server 113 may parameterize the anomaly to define which vehicles 121, 131, 141 should actually process a data broadcast sent by the station 101. While illustrative road anomalies and software anomalies are show in Figures SA and SB respectively, it is appreciated that any sort of anomaly that could be detected, defined for reporting and for which reporting to multiple vehicles could be suitable handled in a similar manner.

In FIG. 5A, the server 113 receives a report of a road anomaly at 501. This can include, for example, a road hazard (pothole), a new road, a road closing, a construction zone, a dangerous condition, a weather condition, etc. In this example, the server 113 determines an applicable geofence radius (or perimeter) at 503. For example, a pothole may have a constrained perimeter of a mile and directionality associated therewith (given the likely limited impact on most traffic), while a massive construction detour could have a radius of 5-10 miles associated therewith, giving drivers time to change a route prior to reaching any backup.

The server 113 then sets any geographic parameters to be associated with the anomaly at 505. This can include, for example, directionality, boundaries for processing, and any other pertinent information. For example, with a pothole, not only may the radius be set at 0.5 miles, but the server 113 may also set a specific road parameter, so that only vehicles within a half mile of the pothole, traveling in a specified direction, and on the given road, will process the data relating to the pothole.

The server 113 may also set a type-flag at 507, defining a type of anomaly (which will then be included in the broadcast). Certain vehicle owners may want to ignore certain reporting, to avoid over-inundation, so, for example, if the anomaly is of type weather and rain, some vehicle owners may ignore this anomaly (not caring if they drive through rain) while others may not.

The server 113 then prepares a data package at 509, which can include identification of the anomaly as well as any processing-parameters, and any suggested action for avoidance of the anomaly. This can be a detailed plan or can be as simple as, for example, "avoid traveling in leftmost lane between 11 and 12 Mile Roads on Telegraph Rd., to avoid a pothole." When the anomaly is large, navigation systems may be able to route around it, but when the anomaly is highly localized, GPS coordinates may be insufficient to determine a vehicle location relative to the anomaly, and thus the server can provide additional instructions to avoid the localized anomaly.

In FIG. 5B, the server 113 receives reporting of a software anomaly at 511. This can include, for example, a software glitch, error in a display, or other reported software error. The error report may also include a software version and/or a vehicle system to which the software applies (e.g., software error in version 1.02 of Heating Control Software for Heated Vehicle Seat Module).

The server 113 then determines whether there is a patch or update available at 513. Even if there is not a patch, the server 113 may report the error to vehicle owners via email or other methods who have the affected software version installed, which the server 113 can also determine at 513. The server 113 can then set vehicle parameters at 515, such as vehicles having the particular module and/or software version. This could also include a VIN or ESN parameter indicating a set of vehicles, if the vehicles to which the update applied were identifiable through such identification utilization.

The server 113 can include a software fix or other data usable for obtaining a software update or patching software at 517. If, for example, the software is not fixable via an over the air update, the fix could include instructions (that can be delivered to a vehicle occupant) to schedule a visit to the dealer. Finally, the server 113 prepares the software package for delivery, along with broadcast instructions at 519 and then sends the data to the station 101.

FIG. 6 shows an illustrative example of a process for received-broadcast handling, executable by, for example, vehicle 121. In this example, the vehicle 121 receives the ATSC broadcast at 601. Since a vehicle 121 will receive all ATSC broadcasts while it is within a broadcast region, the vehicle 121 may need to have a process for handling the broadcasts, to avoid wasting processing cycles and energy on handling inapplicable broadcasts.

If the broadcast includes geographic parameters at 603, the vehicle 121 treats the data as a traffic anomaly incident. If the broadcast includes vehicle identification parameters or system or software parameters at 605, the vehicle 121 treats the data as a software problem notification. Other parameters could also be used to identify other types of broadcasts as suitable.

If the data is a traffic anomaly, the vehicle 121 determines if the present GPS coordinates for the vehicle 121 match a coordinate set defined for the traffic broadcast at 607. In other instances, a vehicle heading or road may be used for matching, or a determination of whether any applicable coordinates are along a vehicle route. If there is a current match (i.e., the broadcast immediately applies to the vehicle), the vehicle 121 sends the updated data to the vehicle navigation system at 615.

If there is not a current match, this does not guarantee that the data will not ever apply to that particular vehicle, since the data relates to a proximate road condition and the vehicle is traveling. Accordingly, the vehicle 121 determines if a present route (or heading and road) will carry the vehicle 121 within the relevant coordinate set. If there is a route match at 609, the vehicle 121 can queue the data at 613 for use when the current GPS data matches, or the vehicle 121 can otherwise ignore the data at 611.

If the data pertains to a software update, the vehicle 121 determines at 617 if the vehicle 121 includes the relevant identified software version or module. If not, the vehicle 121 ignores the data at 619, but if there is a match, then the vehicle 121 sends the data to a software update process at 621 for handling when appropriate. If there is no software, the vehicle 121 may send the data to a notification process, for example, to notify the driver that a fix is needed, but not available over the air.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   a processor configured to:
   wirelessly receive identification of at least one of a road closure or road damage from one or more vehicles, the identification including vehicle location information of the vehicle when the vehicle identified the road closure or the road damage;
   determine a locality to which the road closure or the road damage applies, including determining one or more vehicle-travel directionalities to which the road closure or road damage applies;
   determine one or more television broadcast stations predefined as having a broadcast area that covers the locality;
   determine navigation avoidance instructions data for vehicle navigation systems to address the road closure or the road damage;
   create navigation data including receipt instructions instructing vehicles being within the area affected or including the area affected on a route, determinable based on parameters included in the receipt instructions and including at least the one or more vehicle-travel directionalities, to accept the navigation data, for instances of road closure, or instructing vehicles being within a predefined area surrounding the road damage, the predefined area defined in the receipt instructions and including at least the one or more vehicle-travel directionalities, to accept the data, for instances of road damage and
   deliver the navigation data, including at least one of a definition of an area affected by the road closure or an areas surrounding the road damage and one or more lanes to which the road damage applies, to the determined television stations, along with broadcast instructions for the television stations to broadcast the navigation data via Advanced Television System Committee (ATSC) technology, wherein the broadcast navigation data includes the receipt instructions.

2. The system of claim 1, wherein the navigation data further includes receipt instructions instructing vehicles to accept the data for instances of road damage based on present vehicle location of a given receiving vehicle.

3. The system of claim 2, wherein the receipt instructions further instruct vehicles to accept the data for instances of road damage based on a present vehicle heading of the given receiving vehicle.

4. The system of claim 2, wherein the receipt instructions further instruct vehicles to accept the data for instances of road damage based on a present vehicle lane of the given receiving vehicle.

5. The system of claim 1, wherein the broadcast instructions include an hourly time span for broadcast, corresponding to times when at least one of the road closure or the road damage has been reported to affect travel.

6. The system of claim 1, wherein the broadcast instructions include a daily time span for broadcast, corresponding to days of the week when at least one of the road closure or the road damage has been reported to affect travel.

\* \* \* \* \*